April 22, 1930.  F. MATTENKLOTT  1,755,742
MAP FINDER
Filed June 14, 1927
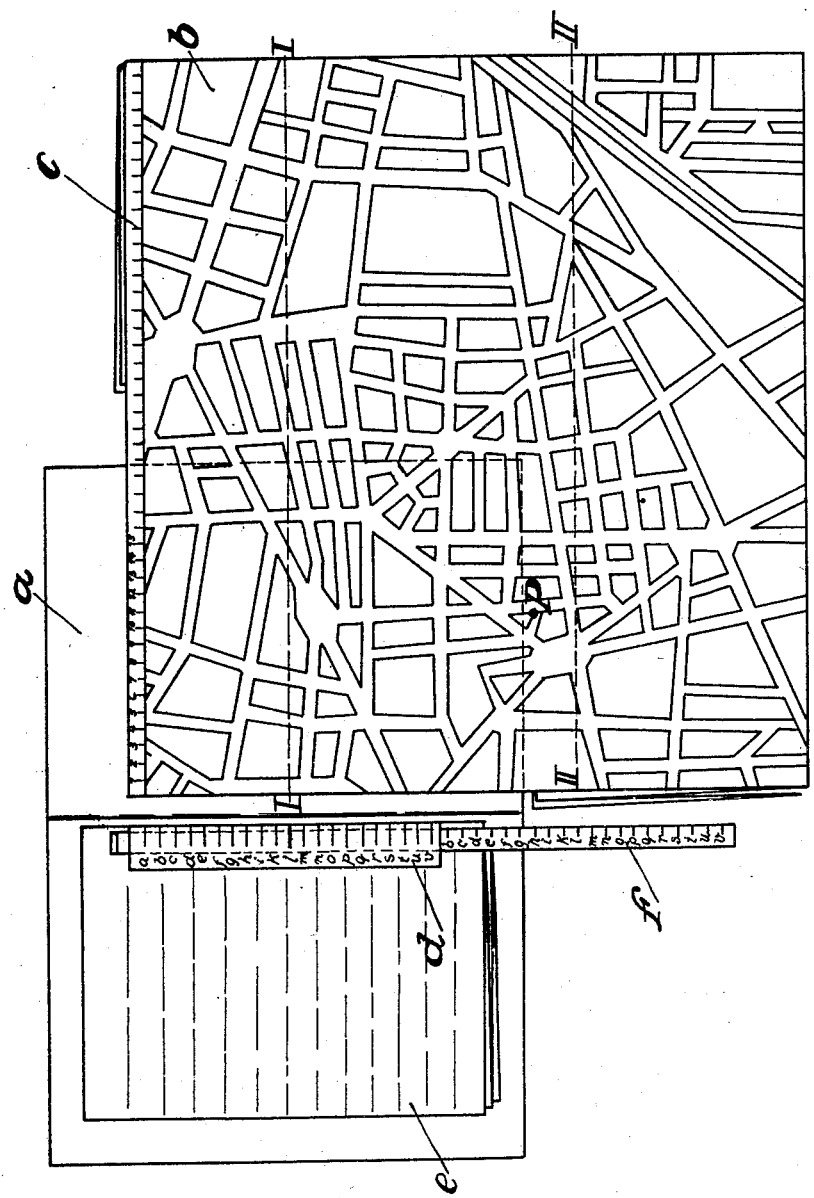

Patented Apr. 22, 1930

1,755,742

UNITED STATES PATENT OFFICE

FRIEDRICH MATTENKLOTT, OF BERLIN, GERMANY

MAP FINDER

Application filed June 14, 1927, Serial No. 198,783, and in Germany October 28, 1926.

This invention relates to a device for quickly and conveniently finding particular points on maps, town plans and the like of all kinds and has as its principal object to obviate the usual laborious investigation with the aid of co-ordinates printed on the maps or plans. An advantage which results from the obviation of these co-ordinate lines resides in the fact that the plan or map itself is made considerably clearer and less confused.

According to the present invention the sought point on the plan or map is found by means of a "finder" which is either associated loosely with the plan or map or is secured to the folder enclosing the same in such a manner that said finder may be moved horizontally or vertically over the map or plan.

To enable the finder to be moved with certainty over the map or plan the latter is subdivided into separate sections or strips which are indicated thereon either by printed lines or by the folding or by means of a guide line along which the finder is moved. If guide lines are employed, these are preferably so arranged that they correspond to the centre line of the finder. So that separate portions of the map or plan may be investigated by means of the finder without it being necessary to spread out the plan or map to its full extent, the latter is folded in a zigzag fashion both transversely and vertically. Any sub-division of the plan may then be brought within the reach of the finder by simple folding and unfolding of the zig-zag folds. Where the finder is not associated with the map as a separate member it is mounted so as to be capable of horizontal movement on the folder of the map by means of suitable connecting elements, such as cord, strips or the like, or, which is preferable, on the front edge of a street or place directory secured to the cover or to the preceding text. The directory will contain appropriate references for use with the map and explanatory notices. It may, however, be amplified or replaced as desired by advertisements or by unprinted paper strips.

In many cases it is desirable to be able to survey at a time a larger surface of the plan or map than that corresponding to a single section. For this purpose the finder may be extended on both sides by expanding it to one or more times its original length. These auxiliary finders, made effective by extension, are limited as to their extension in such a manner that when fully extended they form an extension of the main finder scale.

One embodiment of the invention is illustrated by way of example in the accompanying drawing in which the case of an extensible finder associated with a directory and plan is illustrated.

Referring to the drawing $a$ indicates a folder or the like inside which a map $b$, for example a plan of a town, is secured. The plan is so folded as to allow of definite sections of plan only, having the width of the finder, being unfolded at a time for inspection. Said sections of the plan may be furnished with guide lines to enable the finder to be guided over the plan with certainty. These guide lines I, II are preferably arranged on the separate plan-sections in such a manner as to coincide with the middle lines of each of said sections; due to this provision the finder may be positioned correctly on the plan simply by laying the centre line of the finder, preferably having a thicker or otherwise distinguished scale mark, on the guide line. The upper and lower edges of the plan are provided with a scale $c$ indicating the vertical co-ordinates. The investigation in the horizontal direction is effected by means of the finder $d$ which is fixed to the edge of the directory $e$ secured in turn to the inside of the cover of the folder. The directory is folded in a zig-zag manner and has a length at least equal to the width of the plan. In order to enable one to examine with the finder $d$ more than one section of the plan at a time said finder is provided with an extensible scale $f$ and $g$ which permits to cover several (for example as illustrated, two) sections of the plan. The two strips of which the slide $f$ is composed are limited in respect of their longitudinal extension in such a manner that in the fully drawn out position their scale forms a direct continuation of that of the main portion $d$ of the finder.

The various modifications set forth above should be clear after the explanation and do not require separate detailed description.

The device is employed in the following manner:—

A particular point, say P, is for example looked up in the directory $e$ and the reference "II 10h" is found therein. The plan or map is then folded so that the guide line II lies under the scale mark $l$ of the finder $d$. The finder is next moved along the line II until it comes above the scale value 10 of the scale $c$. The sought point must now lie immediately opposite the scale mark $h$ of the finder.

From this example the advantage of the finder extensions $f, g$ is also clear. Referring to the case illustrated it will be seen that it is sufficient to fold the plan in the manner shown in the drawing. The scale mark $h$ of the fully extended auxiliary finder $f$ will then indicate the sought point P.

Instead of being glued or otherwise secured to the edge of the street directory $e$ the finder may also be held in the folder by means of bands or strips which allow of it being moved across the plan. Where plans or maps are to be mounted on the wall, the finder is preferably furnished as a separate member. In contradistinction to known devices it is an important advantage that the use of the present device is not attended by damage to the map or plan.

I claim:

1. In locating means for maps, the combination of a map provided with ordinates at its margin in one direction and foldable in zig-zag manner in the other direction to form a plurality of strips, a guide line on each of said strips, a scaled finder of a length equal to the width of said strips, said finder being fastened to the edge of a directory so as to be movable in said one direction over said strips and provided with a distinguishing scale mark adapted to be brought in alignment with said guide line.

2. Locating means for maps, as specified by claim 1, in which the finder is extensible in said other direction to permit surveying of said map over more than one of said strips.

In testimony whereof I affix my signature.

FRIEDRICH MATTENKLOTT.